United States Patent [19]

Takada

[11] 4,249,755
[45] Feb. 10, 1981

[54] INPUT MOTION COUPLING TO A MOTION AMPLIFIER FOR USE IN PASSIVE SEAT BELT RESTRAINT SYSTEMS

[76] Inventor: Juichiro Takada, 3-12-1 Shinmachi Setagayaku, Tokyo, Japan

[21] Appl. No.: 33,569

[22] Filed: Apr. 27, 1979

[30] Foreign Application Priority Data

Jan. 22, 1979 [JP] Japan .................................. 54-4771

[51] Int. Cl.$^3$ .......................................... B60R 21/10
[52] U.S. Cl. ................................... 280/804; 297/469
[58] Field of Search .................. 280/804, 803, 802; 297/469

[56] References Cited

U.S. PATENT DOCUMENTS

| | | | |
|---|---|---|---|
| 3,857,581 | 12/1974 | Kaneko | 280/802 |
| 3,895,824 | 7/1975 | Bauer | 280/804 |

*Primary Examiner*—John A. Pekar
*Attorney, Agent, or Firm*—Brumbaugh, Graves, Donohue & Raymond

[57] ABSTRACT

A passive occupant restraint belt system for a vehicle which includes a restraining belt and apparatus for moving the belt from an occupant-restraining to an occupant-releasing position in response to opening of a door of the vehicle. A belt transfer device engages the seat or shoulder belt for moving the belt from the restraining to the releasing position and is actuated by a motion transmission mechanism which transmits and amplifies opening motions of the door to the belt transfer device. The transmission includes a motion amplifier mounted on either the vehicle body or door, and an extendable linkage having one end attached to the other of the body and door and its other end coupled to an input component of the motion amplifier. The linkage has a first link provided with an indentation partway along its length, a second link carrying a lever adjacent one end and coupled adjacent its other end to the door amplifier. The first link has a detent for engaging the first link in the form of a spring loaded pin which is received in the indentation in the first link, but releasable in emergency situations when the motion amplifier or belt transfer device is inoperative to permit the door to be opened.

7 Claims, 5 Drawing Figures

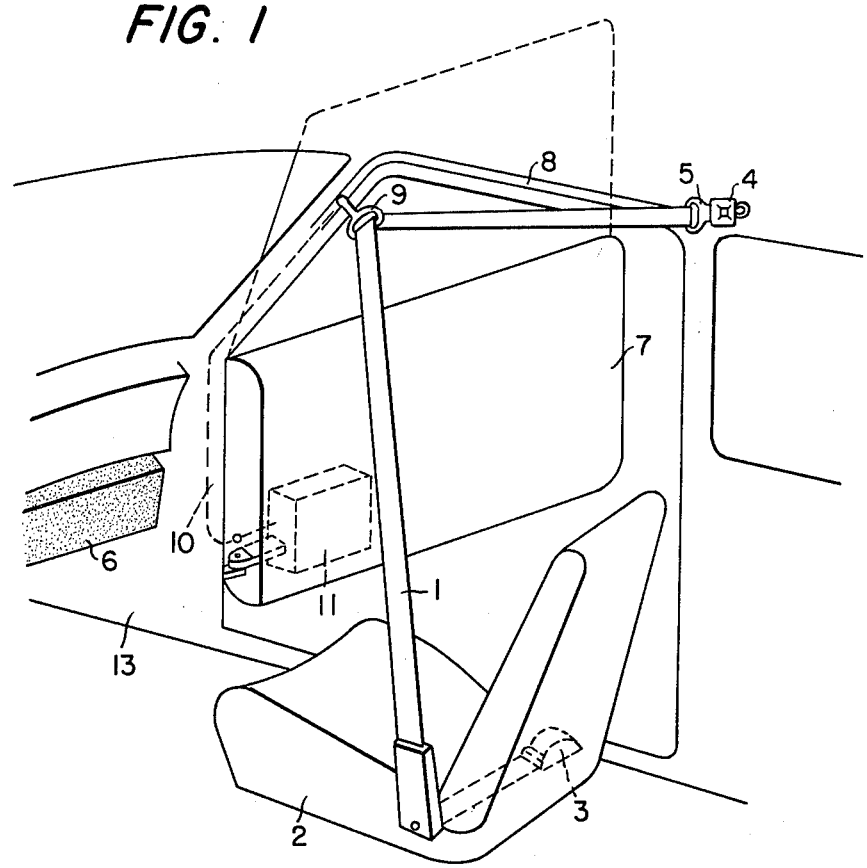
FIG. 1
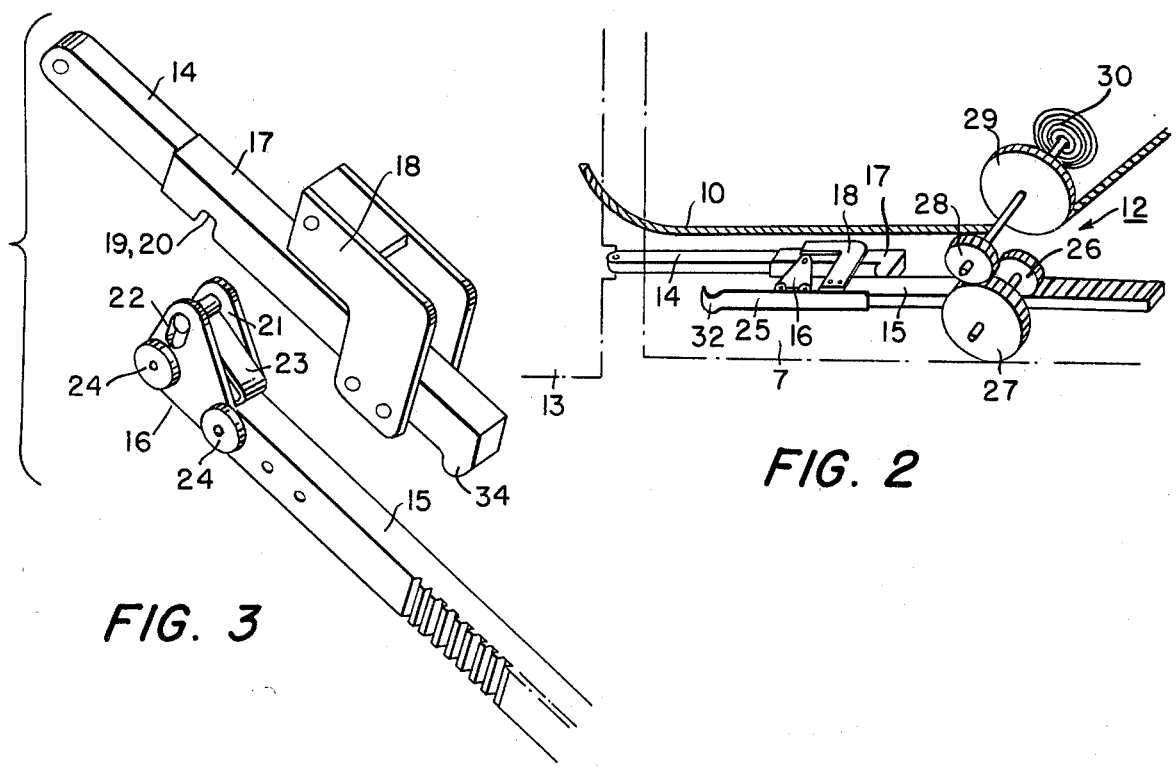
FIG. 2
FIG. 3

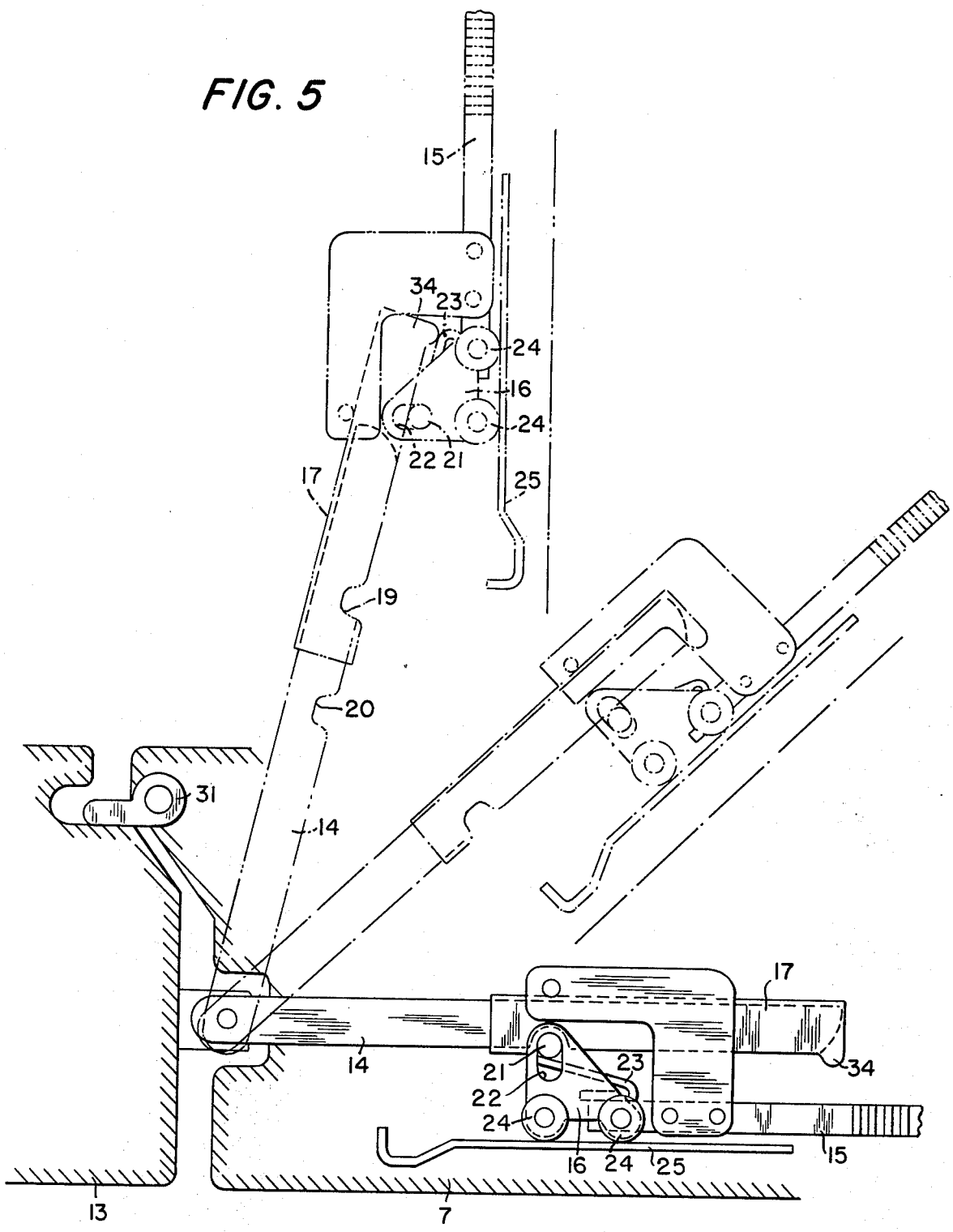

INPUT MOTION COUPLING TO A MOTION AMPLIFIER FOR USE IN PASSIVE SEAT BELT RESTRAINT SYSTEMS

BACKGROUND OF THE INVENTION

This invention relates to a passive vehicle occupant restraint belt system in which the belt is automatically, easily and effectively transferred between an occupant-restraining and an occupant-releasing configuration in response to opening and closing movements of a vehicle door.

In recent years there have been many proposals for passive occupant restraint systems for vehicles. The most common type of restraint systems are those based on restraint belts, and most of the proposed belt systems include a belt transfer mechanism which is driven by an electric motor or a mechanical lever or gear transmission. In the case of mechanical drives, a motion transmitting device is coupled between the belt transfer device and the vehicle body or door for transmitting and amplifying the door opening and closing movements. One such mechanical device, which is capable of moving the restraining belt from an occupant-restraining to the occupant-releasing position in response to a partial opening of the door is shown and described in commonly owned U.S. patent application Ser. No. 950,020 filed Oct. 10, 1978.

In the case of an accident, however, where the vehicle body or door is deformed, the motion transmission and belt transfer devices may be damaged and possibly rendered inoperative. This poses a significant danger, since the binding of the belt transfer mechanism or motion transmission device would interfere with the opening or closing of the door and may cause the driver or passengers to be trapped inside the damaged vehicle.

SUMMARY OF THE INVENTION

There is provided, in accordance with the present invention, a passive vehicle occupant restraint belt system which includes apparatus for moving a restraint belt from an occupant-restraining to an occupant-releasing position in response to opening of the vehicle door. The apparatus moves the belt by transmitting and amplifying the opening motion of the door to a belt transfer device, such as a wire, a racked wire, or a tape connected to a transfer guide which engages the belt. In the case of an accident or emergency, however, where the mechanism has been damaged and is thus inoperative, the belt system according to the present invention permits the mechanism to be released and the door to open.

In particular, the mechanism comprises a belt transfer device engaging the belt and arranged to move the belt from the restraining to the releasing position, and a motion transmitting device coupled to the belt transfer device for transmitting and amplifying the opening motion of the door to the belt transfer device. The transmission device includes a motion amplifier mounted on either the vehicle body or the door, and an extendable linkage having one end attached to the door when the amplifier is mounted on the body, or the body when the amplifier is mounted on the door. The other end of the linkage is coupled to an input component of the motion amplifier. The linkage has a first link with an indentation partway along its length, and a second link carrying a lever mechanism adjacent one end and coupled adjacent its other end to the motion amplifier. The lever is coupled to the first link by a detent in the form of a spring loaded pin supported in a slot in the lever and received in the indentation. When engaged, opening and closing movements of the door are transmitted through the linkage to the motion amplifier to thus actuate the belt transfer device. Should the belt transfer device become inoperative and thereby bind, however, a door opening force against the immovable motion amplifier causes the detent to release, that is, the pin to retract in the slot out of engagement with the indentation in the first link, permitting the first and second links to move freely relative to each other. With the linkage thus disconnected, the door is no longer rigidly coupled to the motion amplifier, and may open freely.

In a preferred embodiment, the transmission is designed to move the belt from the occupant-restraining to the occupant-releasing positions in response to a partial opening of the door. The lever mechanism is pivotally connected to the second link so that the pin can pivot into and out of engagement with the indentation in the first link. The lever mechanism includes rollers for movement along a guide rail attached to the vehicle door or body, which retains the lever mechanism in contact with the first link.

The guide rail is adapted so that as the door is moved from its closed to a partially open position, the lever mechanism moves along part of the guide rail whereby the pin is supported in engaging relation with the indentation of the first link to transmit the opening movement of the door through the linkage to the motion amplifier. Upon continued opening of the door, however, the rollers of the lever mechanism move to a portion of the guide rail wherein the lever is pivoted away from the first link, and the pin is moved out of engagement with the indentation so that upon further opening of the door, the door movement will no longer be transmitted to the motion amplifier.

In a preferred embodiment, the motion amplifier includes a gear train having an input pinion, which is actuated by a meshing rack gear portion of the second link. The gear train also includes a large gear concentric to and rotatable with the input pinion, a second pinion meshing with and driven by the large gear, and an output gear or reel concentric to and rotatable with the second pinion, the type of output element depending upon what driving element is used in the belt transfer device. For example, a racked wire transfer device will be driven by an output gear, while a wire driving element will be driven by a reel.

It is desirable to include a spiral torsion spring in association with the motion amplifier for storing energy when the door is closed and returning stored energy when the door is opened, thereby to assist in driving the transfer device. The same amplifier can be used to drive two transfer devices, for example, a racked wire which is received within a guide rail and installed in the vehicle roof and a second racked wire received in a guide rail installed in the vehicle door, each of the racked wires having a belt guide which moves along the rail and transfers a portion of one or more occupant restraint belts of the belt system.

For a better understanding of the invention reference may be made to the following description of an exemplary embodiment, taken in conjunction with the figures of the accompanying drawings.

BRIEF DESCRIPTION OF THE DRAWINGS

FIG. 1 is a pictorial view in schematic form of an embodiment of a complete belt restraint system shown in the occupant-releasing configuration;

FIG. 2 is a pictorial, schematic illustration of a transmission mechanism and part of a belt transfer device for use with various belt restraint systems such as that shown in FIG. 1;

FIG. 3 is a perspective view of the parts of an extendable linkage for transmitting door opening movement to the motion amplifier;

FIG. 5 is a schematic representation of the linkage configuration for the linkage shown in FIG. 4 during various stages of door opening movement where the motion amplifer or belt transfer device are inoperative.

DETAILED DESCRIPTION OF A PREFERRED EMBODIMENT

Figure 4:
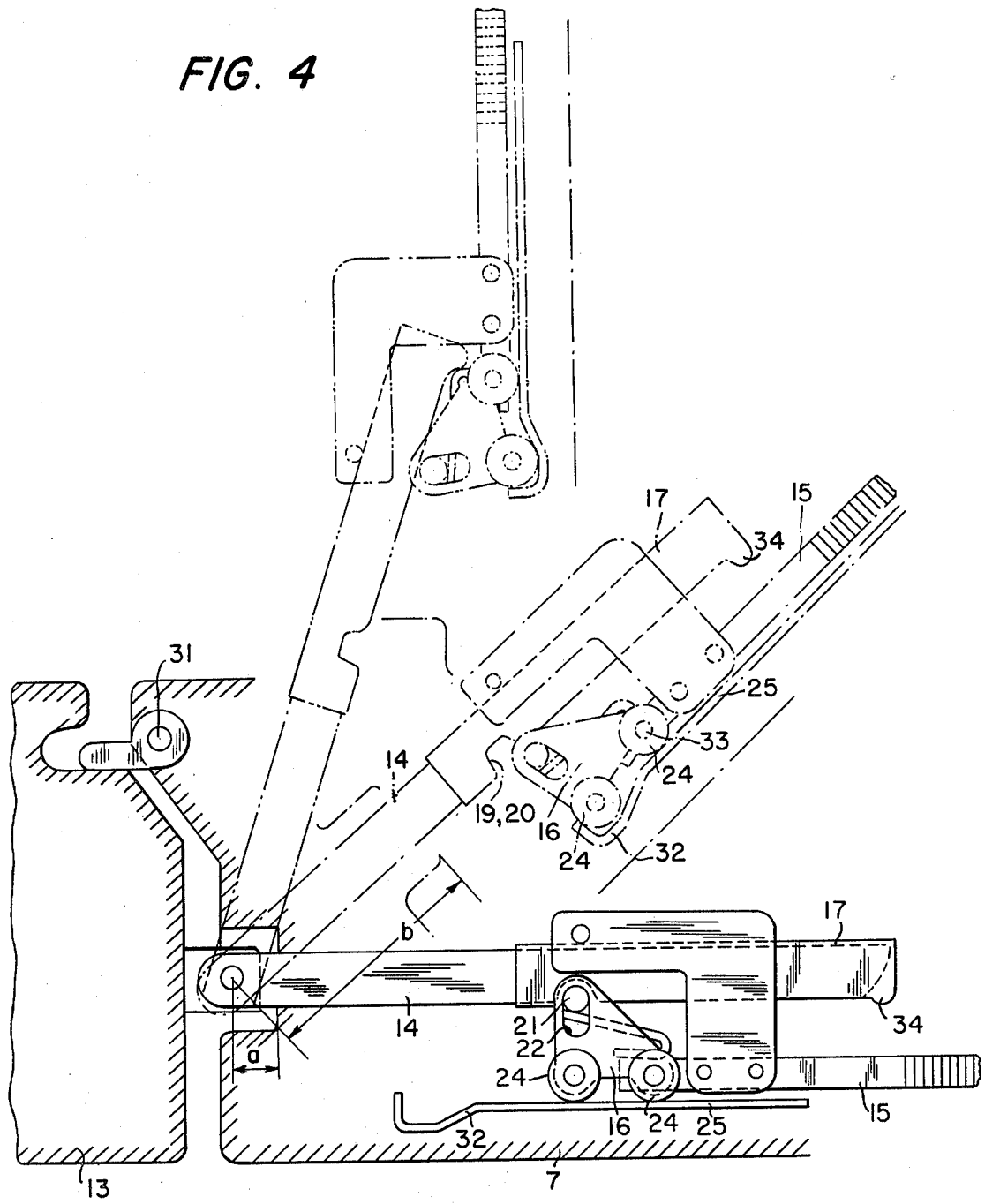
FIG. 4 is a schematic representation of the normal linkage configuration during various stages of door opening movement.

Referring to FIG. 1, a typical belt restraint system is shown in its occupant-releasing configuration. A shoulder belt 1 extends diagonally across one of the vehicle seats 2, to a retractor 3 attached to the lower portion of the seat 2. The retractor acts as a take-up mechanism for one end of the belt 1. The belt 1 is attached at its other end to a ring 5 received in a buckle 4 on the inside of the vehicle body in the roof. The belt 1 also extends through a belt transfer guide 9 which is movable in a track 8 from an occupant-releasing position, shown in FIG. 1, to an occupant-restraining position wherein the belt transfer guide 9 is moved in the track 8 rearwardly toward the buckle 4. As shown in FIG. 1, a knee bar 6 may be attached to the front of the driver or passenger compartment for protecting the lower half of the occupant's body. The wire 10, track 8, and belt transfer guide 9 form the belt transfer device of the system.

The belt transfer guide 9 is moved between the occupant-releasing and occupant-restraining positions, in response to opening and closing movements of the door, by a wire 10 driven by a transmission mechanism 11, which is actuated in turn by an extendable linkage connected between the vehicle body and door.

The parts forming the extendable linkage are shown in FIG. 3, and include a first link 14 and a lever mechanism 16 which is pivotally connected at the forward end of a second link 15. The first link 14 is press-fitted into a sleeve 17 and frictionally held therein. The frictional sleeve 17 is received in a guide support 18, which is attached to the second link 15 (see FIG. 2). The first link 14, as well as the sleeve 17, are formed with a common indentation, 19 and 20 respectively, adapted to receive a pin 21 of the lever mechanism.

The pin 21 is secured in the lever mechanism in a slot 22, with a spring 23 present to bias the pin toward the indentations, 19, 20. The lever mechanism also has rollers 24, for movement along a guide rail 25 attached to the door 7, as described below.

As assembled, one end of the first link 14 of the extendable linkage is pivotally attached to the vehicle body 13. The sleeve 17 is supported by the guide support 18 but would be able to slide in the guide support 18 if not prevented by the pin 21 engaging the indentation 19, 20. As shown in FIG. 2 and in the solid line configuration of FIGS. 4 and 5, however, when the door is in its closed position, the pin 21 is received in the indentation 19, 20. When so captured, the sleeve 17 is fixed relative to the lever mechanism 16 and guide support 18, and thus the second link 15, which serves as the input to the motion amplifier 12, is rigidly coupled to the vehicle body 13 through the extendable linkage.

The motion amplifier 12 includes a first pinion 26, which meshes with a rack portion on the second link 15. A large gear 27 is concentric to and rotatable with the input pinion 26, and in turn drives a second pinion 28. A second large gear 29, concentric with the second pinion 28 and rotatable therewith, engages the wire 10, to move the wire 10 and thereby the belt transfer guide 9 back and forth. As shown in FIG. 2, the wire 10 may be a racked wire engaging cooperating teeth in the second large gear 29. A spiral torsion spring 30 is also connected to the motion amplifier 12 for storing energy when the door is closed and returning stored energy when the door is open, thereby to assist in driving the belt transfer device.

The operation under normal conditions of the extendable linkage is shown in FIG. 4. When the door, which pivots about 31, is closed, the position of the extendable linkage is shown in the solid line configuration. The point of attachment of the first link 14 to the vehicle body 13 is spaced apart from the end of the door 7 by a distance indicated by "a." As it is partially opened, the door 7 pivots around point 31 to a position indicated by the dash-dot lines. In its half open position, the distance between the hinge point and the door 7 is indicated by "b," the difference between the two distances, b−a, being the door opening stroke.

As the door moves from its closed to its half-way open position, the lever mechanism 16 moves along the track 25 which is stationary on the door (and thus will move away from the first link 14). The profile of the track 25 during this stage of the door opening operation is such as to keep the pin 21 of the lever mechanism 16 in constant engagement with the indentation 19, 20 of the first link. Thereby, as the door moves from its closed to its half-way open position, the entire door opening stroke movement is transmitted through the extendable linkage to the motion amplifier 12. Accordingly, the gears of the motion amplifier 12 are rotated to move the belt transfer device 9 from its occupant-restraining toward its occupant-releasing position. In this embodiment, the gears of the motion amplifier are sized to move the belt transfer mechanism completely from its occupant-restraining to its occupant-releasing position in response to an input motion through the second link 15 of b−a, the door opening movement transmitted through the extendable linkage when the door is opened halfway, since, as described further on, no additional door movement will be transmitted through the linkage to the motion amplifier.

The door having reached its half-way open position, the lever mechanism 16 has moved along the guide rail 25 to the position shown in the dash-dot configuration. There, the guide rail 25 has a depression 32 to permit the lever mechanism 16 to pivot away from the first link 14, thereby causing the pin 21 to disengage from the indentation, 19, 20 in the first link 14.

Upon further opening of the door from its half-way open position to its fully opened position (indicated by the dash-double dot line configuration), the lever 16 remains stationary with respect to the track 25 and thus the door 7, and the amplifier 12 will not be further actuated. The further door opening movement is not transmitted through the extendable linkage, but is exhibited as lost motion in the extendable linkage. As can be seen in FIG. 2, the lever mechanism 16 moves outwardly along the first link 14 (and sleeve 17) as the door continues its opening movement, with the support guide 18 permitting the sleeve 17 to slide relative to the lever mechanism 16 but maintaining the first link 14 and rod case 17 in contact with the pin 21 until the door 7 reaches its fully opened position. Conversely, when the door is closed, the above process is reversed.

FIG. 5 illustrates the operation of this device in the event that either the motion amplifier 12 is damaged, and thus inoperative, or if the belt transfer device were to be bound up, as may occur during an accident. Once again, the door 7 is shown in its closed position in the solid line configuration of FIG. 5. Upon attempted opening of the door, the opening force would be transferred through the second link 15 into the motion amplifier 12. However, the motion amplifier or belt transfer mechanism will offer considerable resistance to movement, which if great enough, will move the pin 21 against the force of the spring 23 and out of the indentation 19, 20. Once the pin 21 has been retracted in the slot 22 and is out of engagement with the indentation 19, 20, the door 7 would be free to open, as shown in the dash-dotted configuration of FIG. 5, since the lever mechanism 16 merely slides along the bottom of the first link 14 and sleeve 17. Even when the mechanism is damaged, therefore, the vehicle occupant would be able to open the door with substantially no difficulty.

As can be seen in FIG. 5, however, the sleeve 17 is provided with a projection 34 at its outer end, which in the normal operation of the device abuts against the spring 23 when the door is fully opened, and acts as a stop (see FIG. 4). In the emergency operation of the door, however, this projection 34 may interfere with the full opening of the door if the motion amplifier 12 or belt transfer mechanism were bound up. As shown in FIG. 5, in this embodiment the projection 34 will act as a stop after the door is about half-opened. However, further opening of the door 7 is not prohibited, notwithstanding the projection 34, due to the frictional attachment of the sleeve 17. Upon encountering the projection 34, further force on the door will cause the sleeve 17 to separate from the first link 14 and thereby permit the door to be fully opened, as shown in the dash-double dotted line configuration of FIG. 5.

Although the invention has been shown and described with reference to a preferred embodiment thereof, it will be understood that variations and modifications of the device will be apparent to those skilled in the art while remaining within the inventive principles disclosed herein. For example, although as shown the first link 14 is attached to the vehicle body 13, and the motion amplifier attached to the vehicle door 7, it would be equally possible to attach the first link 14 to the door, with the amplifier 12 attached within the vehicle body 13, without affecting the operation of the invention. All such modifications are intended to be within the scope of the invention as defined in the following claims.

I claim:

1. In a passive occupant restraint belt system for vehicles which includes a restraining belt, and apparatus for moving the belt from an occupant-restraining to an occupant-releasing position in response to opening of a door of the vehicle comprising belt transfer means engaging the belt for moving the belt from the restraining to the releasing position and motion transmission means coupled to the belt transfer means for transmitting and amplifying opening motions of the door to the transfer means, the transmission means including a motion amplifier mounted on either the vehicle body or door, and a linkage having one end attached to the other of the body and door and the other end coupled to an input component of the motion amplifier, the improvement wherein the linkage comprises a first link connected at one end to the other of said vehicle body and door, a second link carrying a lever adjacent one end and coupled adjacent its other end to said motion amplifier, and detent means for normally coupling said lever to said first link for transmitting door opening motion through said linkage to said motion amplifier and for releasing said lever from said first link for permitting relative movement between said first and second links in emergency situations when said amplifier or belt transfer means is inoperative.

2. Apparatus according to claim 1, wherein said first link has an indentation partway along its length, and said detent means includes a pin adapted to be received in said indentation, said pin being supported in a slot in said lever for movement toward and away from said indentation, and biasing means acting on said pin for urging said pin in said slot towards said indentation.

3. Apparatus according to claim 2 for moving said belt from said occupant-restraining to said occupant-releasing position in response to partial opening of the door, wherein said lever is pivotally attached to said second link, whereby said pin is pivotable into and out of engagement with said indentation, and further comprising control means for maintaining said lever engaged with said first link when said door is in any position between the closed position and a partially opened position and for moving said lever means to a position disengaged from said first link when said door is in the partially opened to fully opened position to allow extension of the linkage by lost motion movement of the first link relative to the second link.

4. Apparatus according to claim 3 and further comprising guide means rigidly connected to said second link for moveably supporting the second link on the first link.

5. Apparatus according to claim 1, 2, 3, or 4 wherein said lever includes rollers and further comprising guide rail means mounted on the door or vehicle body for engaging said rollers and guiding said lever.

6. Apparatus according to claim 4, wherein said lever includes rollers and further comprising guide rail means mounted on the door or vehicle body for engaging said rollers and guiding said lever, said guide rail means supporting said lever means in an engaged position with said indentation along one part of its length and permitting said lever means to pivot away from said first link to move out of engagement with said indentation along another part of its length.

7. Apparatus according to claim 6 and further comprising a sleeve frictionally attached on said first link to extend longitudinally therefrom, said sleeve having means at its outer end for acting as a stop for said lever, during normal operation of said door, when said door is fully opened, the sleeve being extendable to permit further movement of said lever away from said first link when said amplifier or belt transfer means is inoperative.

* * * * *